US008707165B2

(12) United States Patent  (10) Patent No.: US 8,707,165 B2
Nakatsuka  (45) Date of Patent: Apr. 22, 2014

(54) INFORMATION PROCESSING APPARATUS, CONTROL METHOD, AND STORAGE MEDIUM FOR ADJUSTMENT OF ALTERNATE DOCUMENT LAYERS TO REDUCE PRINTED PAGES

(75) Inventor: Tadanori Nakatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 12/909,594

(22) Filed: Oct. 21, 2010

(65) Prior Publication Data

US 2011/0099469 A1   Apr. 28, 2011

(30) Foreign Application Priority Data

Oct. 27, 2009   (JP) ................................. 2009-246670

(51) Int. Cl.
*G06F 17/24*   (2006.01)
*G06F 17/25*   (2006.01)

(52) U.S. Cl.
USPC .......................................... 715/243; 715/246

(58) Field of Classification Search
USPC .................................. 715/243, 252, 253, 246
See application file for complete search history.

(56) References Cited

U.S. PATENT DOCUMENTS

| 5,379,373 | A  | * | 1/1995  | Hayashi et al. ................ 715/235 |
| 7,212,309 | B1 | * | 5/2007  | Sellers et al. .................. 358/1.2 |
| 8,581,834 | B2 | * | 11/2013 | Nishizawa ..................... 345/107 |
| 2005/0195975 | A1 | * | 9/2005  | Kawakita ........................ 380/30 |
| 2008/0177994 | A1 | * | 7/2008  | Mayer ............................... 713/2 |
| 2009/0113088 | A1 | * | 4/2009  | Illowsky et al. ............... 710/62 |
| 2011/0213655 | A1 | * | 9/2011  | Henkin et al. ............. 705/14.49 |
| 2011/0261049 | A1 | * | 10/2011 | Cardno et al. ................ 345/419 |
| 2012/0079431 | A1 | * | 3/2012  | Toso ............................. 715/836 |

FOREIGN PATENT DOCUMENTS

| JP | 2004-214991 A  |   | 7/2004  |
| JP | 2005-149218 A  |   | 6/2005  |
| JP | 2005149218 A   | * | 6/2005  |
| JP | 2007-293655 A  |   | 11/2007 |

OTHER PUBLICATIONS

Fulton, "Adobe Photoshop Elements 3 in a Snap," 768 pages (sections 99 and 101 provided) (2004).*
Johnson, "Adobe InDesign CS4 on Demand," 528 pages (96-97, 178, 180 provided) (Dec. 2008).*
Japanese Office Action issued in corresponding application No. 2009-246670 on Oct. 29, 2013.

* cited by examiner

*Primary Examiner* — Laurie Ries
*Assistant Examiner* — Soumya Dasgupta
(74) *Attorney, Agent, or Firm* — Carter, DeLuca, Farrell & Schmidt, LLP

(57) ABSTRACT

An information processing apparatus for editing a document including a first layer and a second layer. The information processing apparatus determines, when a first layer is selected as a target layer, whether an object in a second page of the first layer, which follows a first page, can be relocated to a blank region in the first page of the first layer. When it is determined that the object in the second page of the first layer can be relocated, the information processing apparatus locates the object in the second page of the first layer to the first page of the first layer.

5 Claims, 13 Drawing Sheets

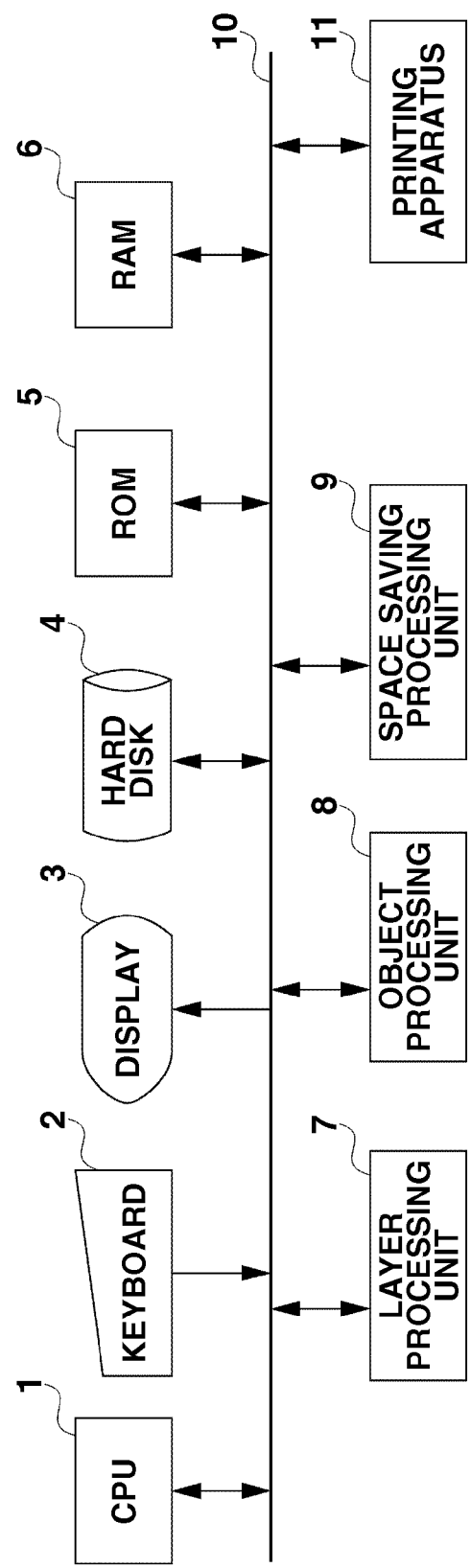

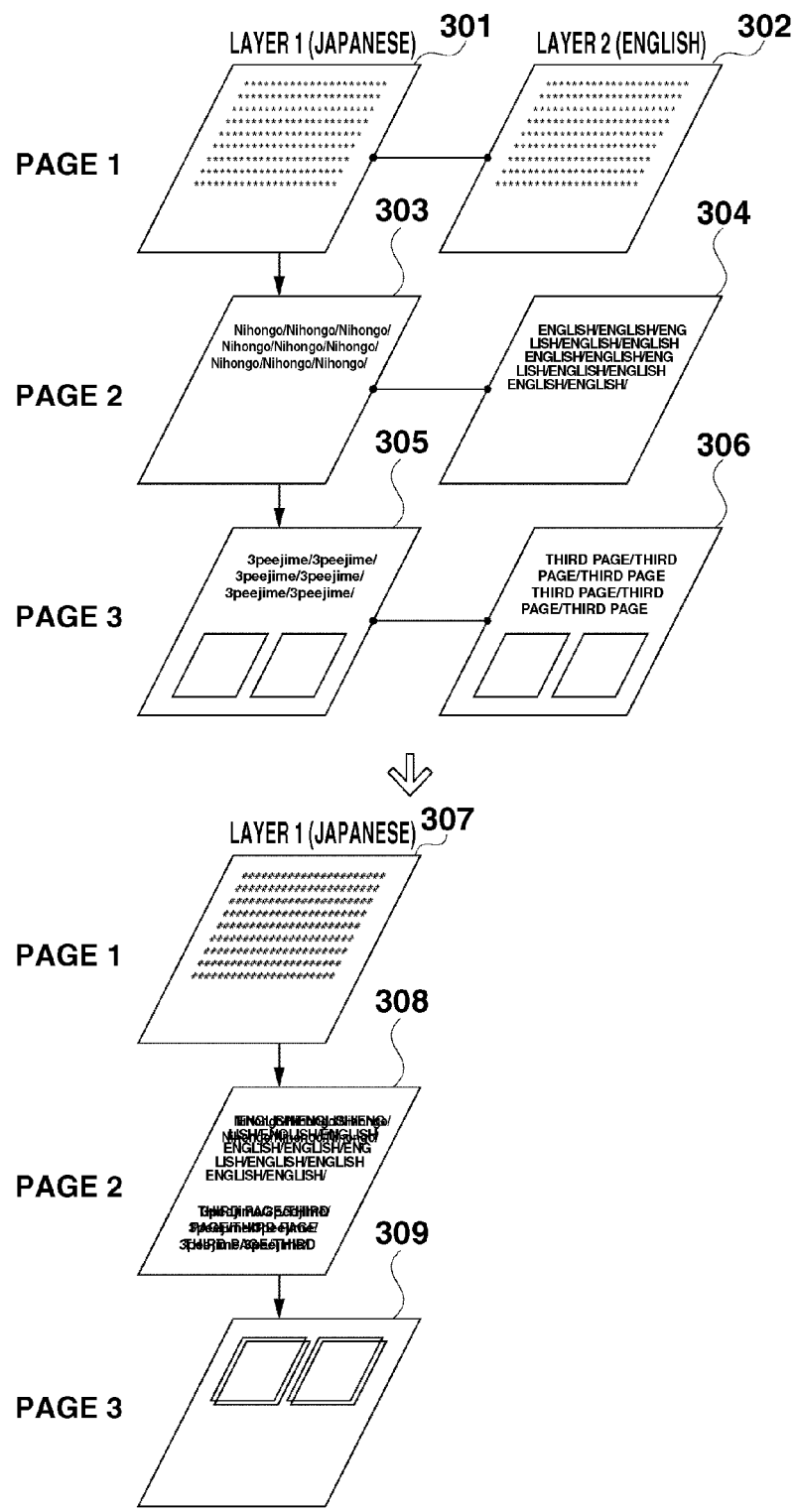

INFORMATION PROCESSING APPARATUS, CONTROL METHOD, AND STORAGE MEDIUM FOR ADJUSTMENT OF ALTERNATE DOCUMENT LAYERS TO REDUCE PRINTED PAGES

BACKGROUND OF THE INVENTION

1. Field of the Invention

The present invention relates to an information processing apparatus for changing a layout to be output to save output sheets of paper.

2. Description of the Related Art

Japanese Patent Application Laid-Open No. 2005-149218 discusses a technique for saving output sheets of paper. The technique discussed in Japanese Patent Application Laid-Open No. 2005-149218 realizes saving sheets of paper by relocating data arranged in the last page to the preceding page.

Recently, documents including a plurality of layers have been increased. In these documents, drawing objects contained in the same page exist in respective different layers. Further, by switching display/non-display of each layer, documents corresponding to respective areas/individuals/models can be easily output.

However, in Japanese Patent Application Laid-Open No. 2005-149218, there are no descriptions about a saving technology of sheets taking layers into consideration. Therefore, processing for saving sheets on a layer-by-layer basis has not been realized.

SUMMARY OF THE INVENTION

According to an aspect of the present invention, an information processing apparatus for editing a document including a first layer and a second layer includes a selection unit, a first determination unit, a layout unit, and an output control unit. The selection unit is configured to select a target layer, which is a target to be processed, from the first layer and the second layer. When the selection unit selects the first layer as the target layer, the first determination unit is configured to determine whether an object in a second page of the first layer can be relocated to a blank region in a first page of the first layer. The second page follows the first page. When the first determination unit determines that the object in the second page of the first layer can be relocated, the layout unit is configure to relocate the object in the second page of the first layer to the first page of the first layer. The output control unit is configured to output a result of changing a location of the object by the layout unit in the first layer selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a hardware configuration of an information processing apparatus according to an exemplary embodiment of the present invention.

FIG. 3 illustrates an example of space saving processing.

DESCRIPTION OF THE EMBODIMENTS

Figure 2A:
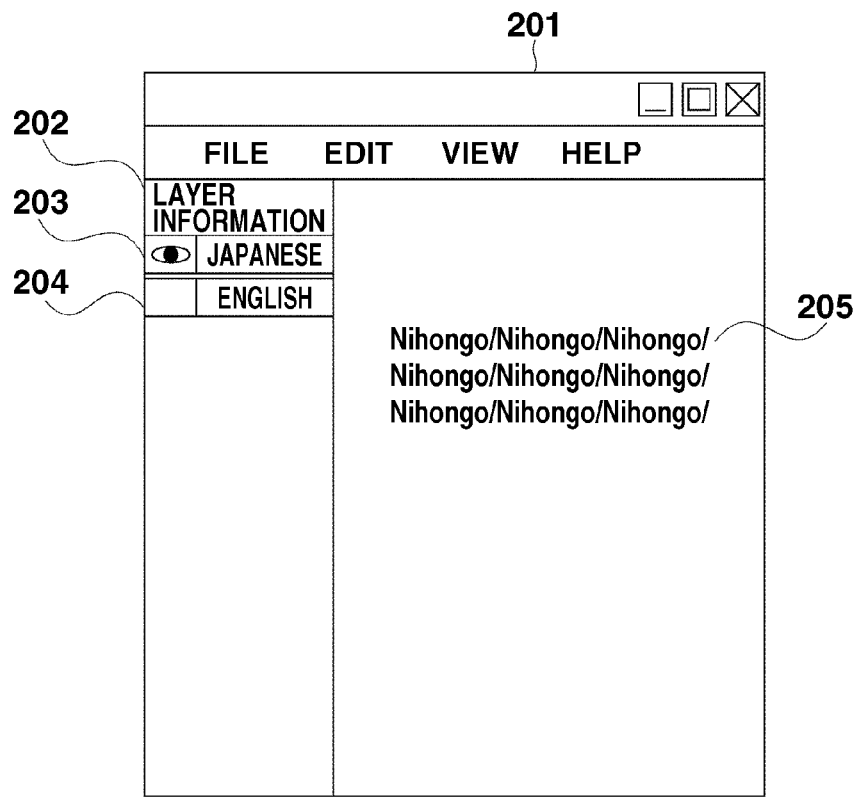
FIGS. 2A and 2B illustrate an example of a setting method for a displayed layer and a non-displayed layer.

Various exemplary embodiments, features, and aspects of the invention will be described in detail below with reference to the drawings.

FIG. 1 illustrates a hardware configuration of an information processing apparatus according to an exemplary embodiment of the present invention.

The information processing apparatus includes a central processing unit (CPU) 1, a keyboard 2 for inputting data, a display 3 for displaying a document, a hard disk 3 for storing a document, a read-only memory (ROM) 5 for storing a program controlling the information processing apparatus and necessary information.

Further, the information processing apparatus includes a random access memory (RAM) 6 used as various work areas, a layer processing unit 7 for acquiring layer information about a drawing object contained in a layer, an object processing unit 8 for processing an object based on the layer information.

Furthermore, the information processing apparatus includes a space saving processing unit 9 for executing saving processing of sheets by deleting (or reducing) a blank space between drawing objects, and a data bus 10 for transferring various data.

Furthermore, a printing apparatus 11 for executing print processing is connected to the information processing apparatus.

Figure 12A:
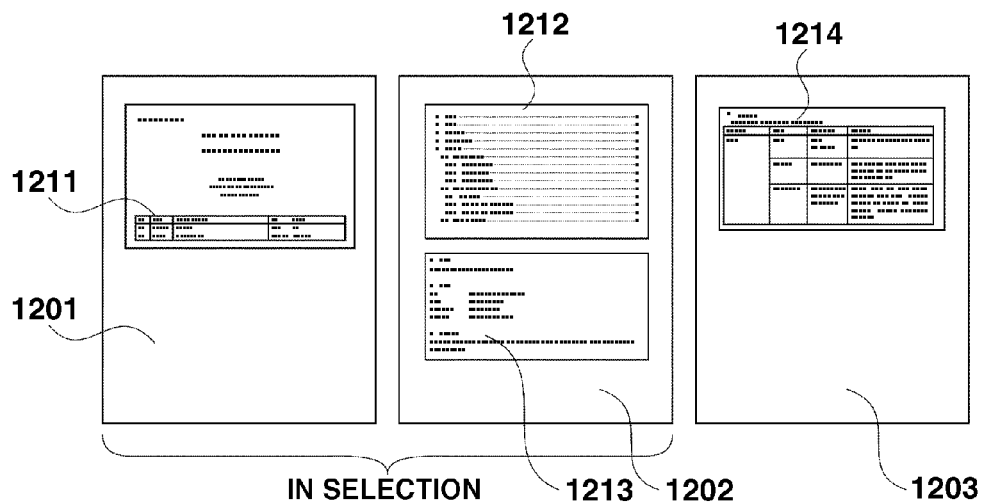
FIGS. 12A and 12B illustrate an example of space saving processing.

The space saving processing will be described referring to FIGS. 12A and 12B. In FIG. 12A, a page 1201 and a page 1202 are selected as a target of layout change (hereinafter referred to as word "in selection"). An object 1211 is located in the page 1201 and an object 1212 is located in the page 1202. When a user designates execution of space saving processing, the space saving processing unit 9 compares the size of a blank space in the page 1201 and the size of a head object 1212 in the page 1202. When the space saving processing unit 9 determines that the object 1212 can fit in the blank space in the page 1201, the space saving processing unit 9 moves the object 1212 in the page 1202 to the page 1201 as illustrated in FIG. 12B.

As a result of this, the object 1211 and the object 1212 are located in the page 1201. A layout position of the object 1213 is changed in the page 1202 to fill the blank region in the page 1202 generated by movement of the object 1212. However, since there is not a blank region available to locate the object 1213 in the page 1201, the object 1213 is not moved to the page 1201. In addition, since there is not a blank region available to locate the object 1213 in the page 1201, the space saving processing unit 9 determines that the object 1213 is not to be moved to the page 1201. However, in addition to this, if the amount of a blank region is smaller than a predetermined threshold value (for example, 50 m in total height), the space saving processing unit 9 can determine that the object 1213 is not to be moved.

Figure 13A:
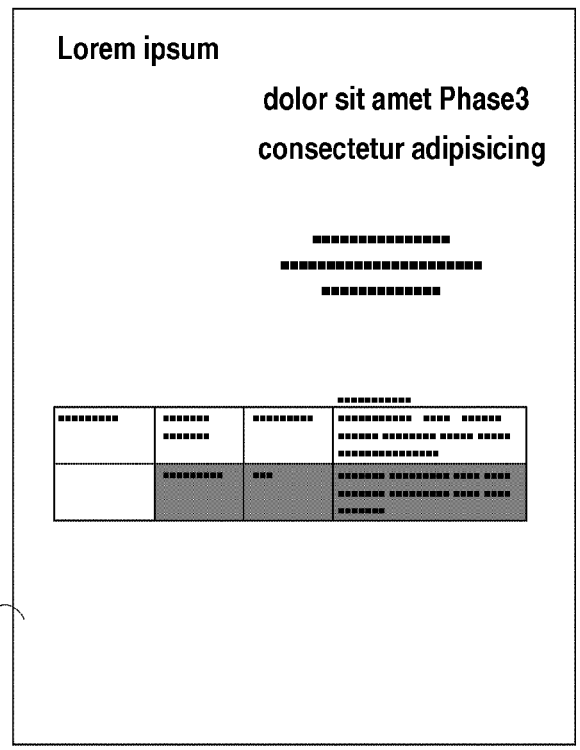
FIGS. 13A and 13B illustrate an example of a blank region.
Figure 13B:
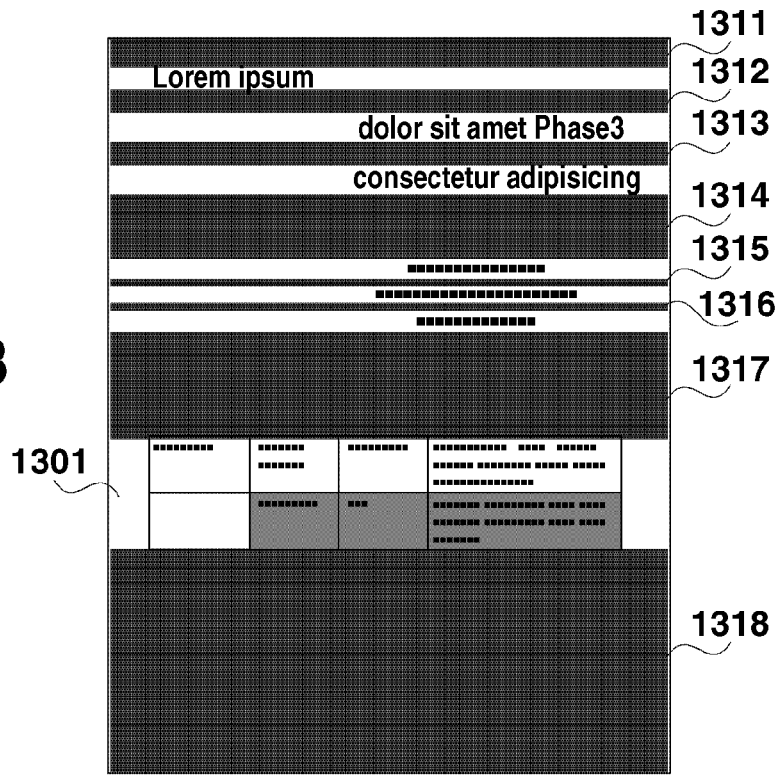

The size of a blank region can be calculated, as an example, by a method illustrated in FIGS. 13A and 13B. When there is a page 1301 in FIG. 13A, blank regions are parts 1311 to 1318, which are shaded in FIG. 13B. More specifically, a region in which there are no objects when a page is horizontally divided into regions is a blank region. In this case, the size of the blank region in the page can be obtained by calculating a total height of blank regions. The height of each region can be obtained from a coordinate position in the page.

Figure 12B:
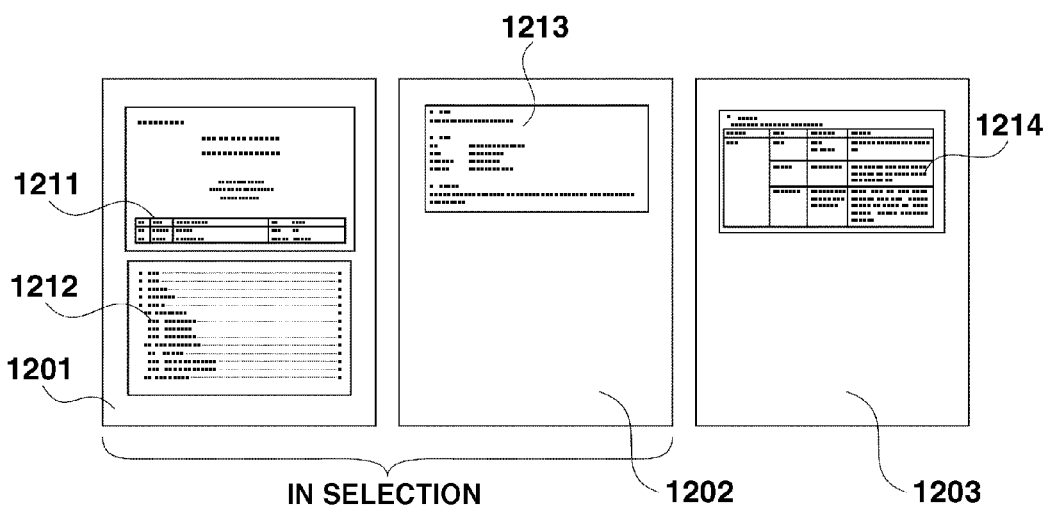

In the page 1202 illustrated in the FIG. 12B, which is acquired by layout change processing, the object 1214 in the page 1203 can be located in a blank region in the page 1202.

Thus, by executing the space saving processing, the information processing apparatus can reduce the number of sheets required for printing from 3 to 2.

Figure 2B:
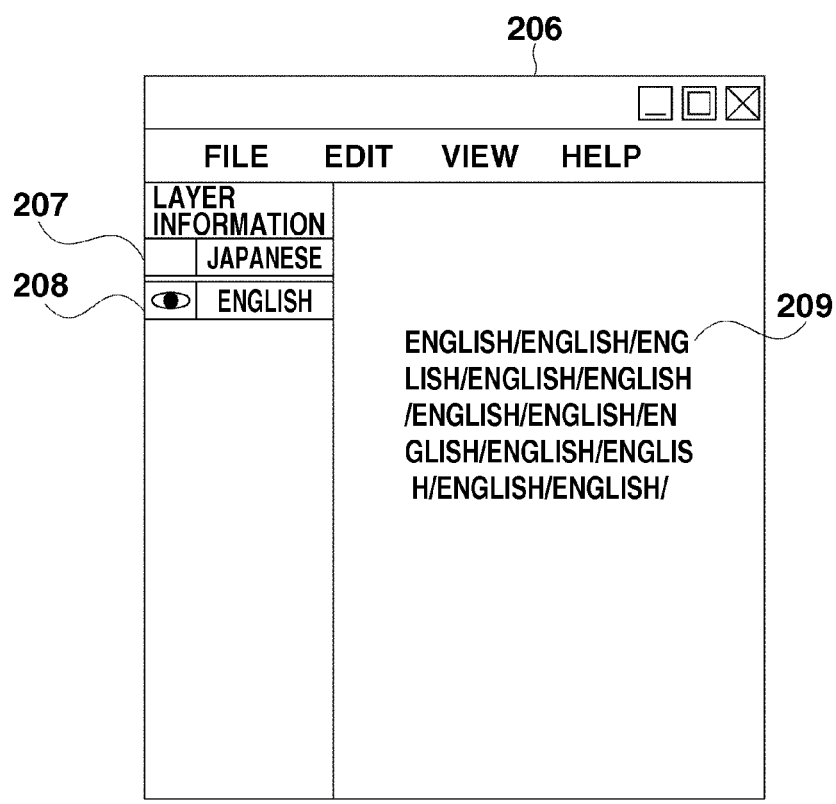

FIGS. 2A and 2B illustrate user interfaces (UI) displaying a document including two layers. In the document in the present exemplary embodiment, Japanese characters (Roman letters in the drawings (actually, Kanji or Kana characters)), are described in the first layer, and English characters are described in the second layer. By switching display/non-display of each layer, the UI illustrated in FIG. 2A or FIG. 2B is displayed with one document. In addition, in FIG. 2A, the first layer is in a display state and the second layer is in a non-display state. On the other hand, in FIG. 2B, the first layer is in a non-display state and the second layer is in a display state.

A preview screen 201 or 206 is displayed on the display 3.

A user can switch the aforementioned display/non-display state by operating the layer information 202 contained in the preview screen 201 or 206.

More specifically, the user sets "Japanese" 203 in the layer information 202, so that Japanese text 205 is displayed as illustrated in FIG. 2A.

On the other hand, in FIG. 2A, since the user does not set "English" 204 in the layer information 202 to be in a display state, an English text is not displayed in FIG. 2A.

Similarly, in the preview screen 206 in FIG. 2B, since "Japanese" 207 in the layer information is not set but "English" 208 is set, an English text 209 is displayed in FIG. 2B.

Since the text 205 and the text 209 are in the same page but in different layers, display/non-display of each text is switched by setting the layer information.

FIG. 3 illustrates an output result acquired by performing the space saving processing without taking layers into consideration.

A document as a present target to be processed includes two layers, i.e., a first layer (hereinafter referred also to as layer 1) and a second layer (hereinafter referred also to as layer 2).

The target document includes, as the first page, a page 301 of layer 1 and a page 302 of layer 2. Similarly, the target document includes, as the second page, a page 303 of layer 1 and a page 304 of layer 2, and as the third page, a page 305 of layer 1 and a page 306 of layer 2.

Pages 307 to 309 are results of executing the space saving processing to the target document without taking layers into consideration.

More specifically, since layers are not taken into consideration, the space saving processing is performed by piling up objects contained in each page, so that a text piled up with the Japanese texts and the English texts is output.

For example, in the layer 1 (303) and the layer 2 (304), which are contained in the second page, the objects contained in these layer are contained in the second page if the layer information is not considered.

Therefore, the space saving processing unit 9 piles up and displays the text of layer 1 and the text of layer 2 in the second page 308, and locates an object, in which the texts of the layers in the third page are piled up, in an unfilled region in the second page 308.

Figure 4:
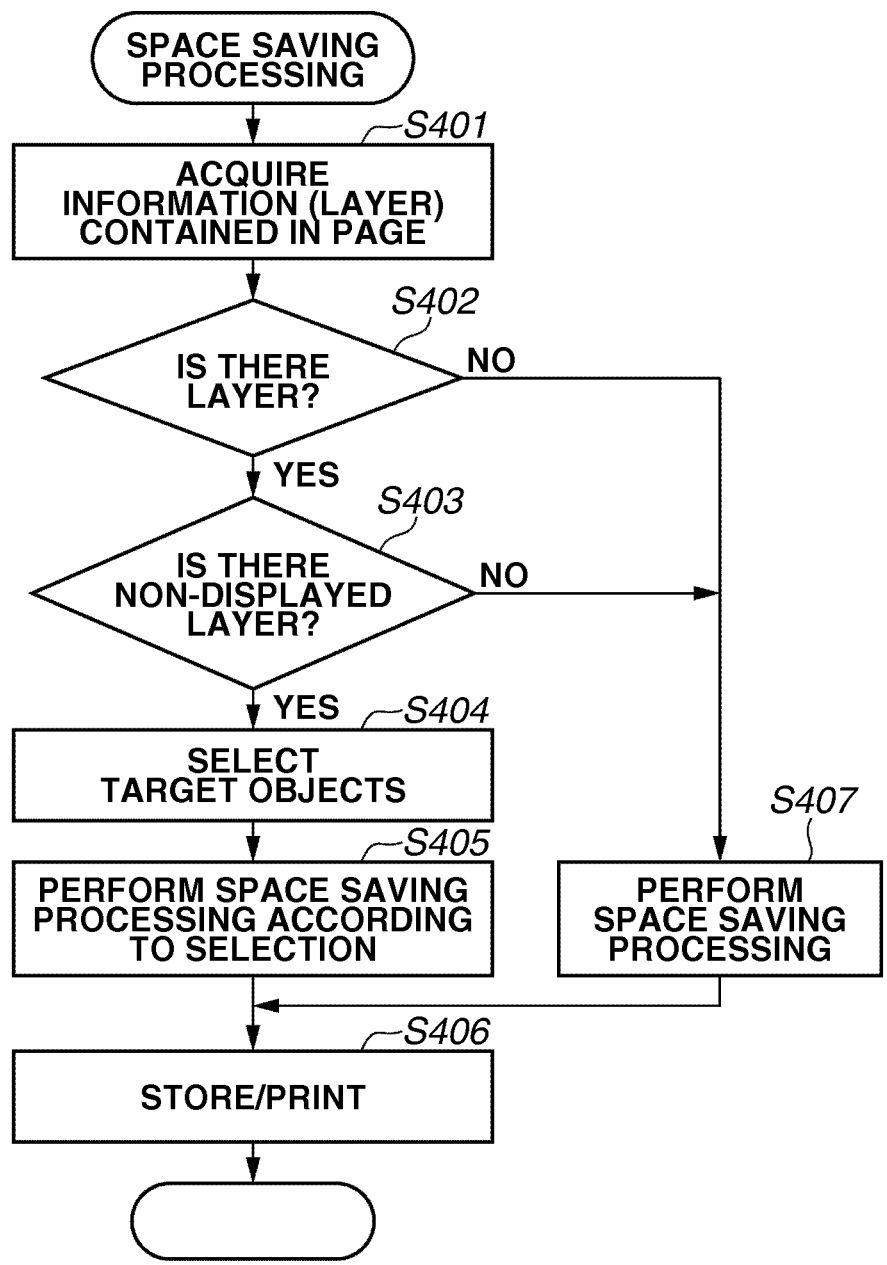
FIG. 4 is a flowchart illustrating space saving processing according to a first exemplary embodiment of the present invention.

FIG. 4 is a flowchart illustrating space saving processing according to the first exemplary embodiment. The CPU 1 reads and executes programs relating to the processing from the ROM 5, so that each step of the flowchart is realized. In addition, the processing illustrated in FIG. 4 is described by using a specific example illustrated in FIG. 5.

In step S401, the layer processing unit 7 acquires information about layers in a processing target page in a target document. In step S402, the layer processing unit 7 confirms whether the target page includes a plurality of layers. The layer processing unit 7 confirms whether the target page includes a plurality of layers by analyzing a description command configuring the page. Since the target document illustrated in FIG. 5 includes two layers in each page, the processing proceeds to step S403.

When the layer processing unit 7 determines that there is not a plurality of layers in step S402, the processing proceeds to step S407.

On the other hand, when the layer processing unit 7 determines that there is a plurality of layers in step S402, then in step S403, the layer processing unit 7 determines whether there is a non-displayed layer. When there is not a plurality of layers in step S402 or there is not a non-displayed layer in step S403, then in step S407, the space saving processing unit 9 executes space saving processing without taking layers into consideration.

This processing is realized by referring to the setting information by a user described in FIGS. 2A and 2B. For example, when a setting illustrated in FIG. 2A is applied for displaying the document illustrated in FIG. 5, the document illustrated in FIG. 5 includes displayed layers (pages 501, 503, and 505 in FIG. 5) and non-displayed layers (pages 502, 504, and 506 in FIG. 5), so that the processing proceeds to step S404.

In step S404, the object processing unit 8 selects an object as a target object of the space saving processing, according to display attributes of layers. In an example illustrated in FIG. 5, the object processing unit 8 selects objects included in the displayed layer (Japanese layer, i.e., pages 501, 503, and 505), as objects of target layer. On the other hand, the object processing unit 8 selects objects included in the non-displayed layer (English layer, i.e., pages 502, 504, and 506), as objects of non-displayed layer.

In step S405, the space saving processing unit 9 performs space saving processing about the objects selected in step S404. The processing in step S405 will be described in detail with reference to FIG. 5.

Figure 5:
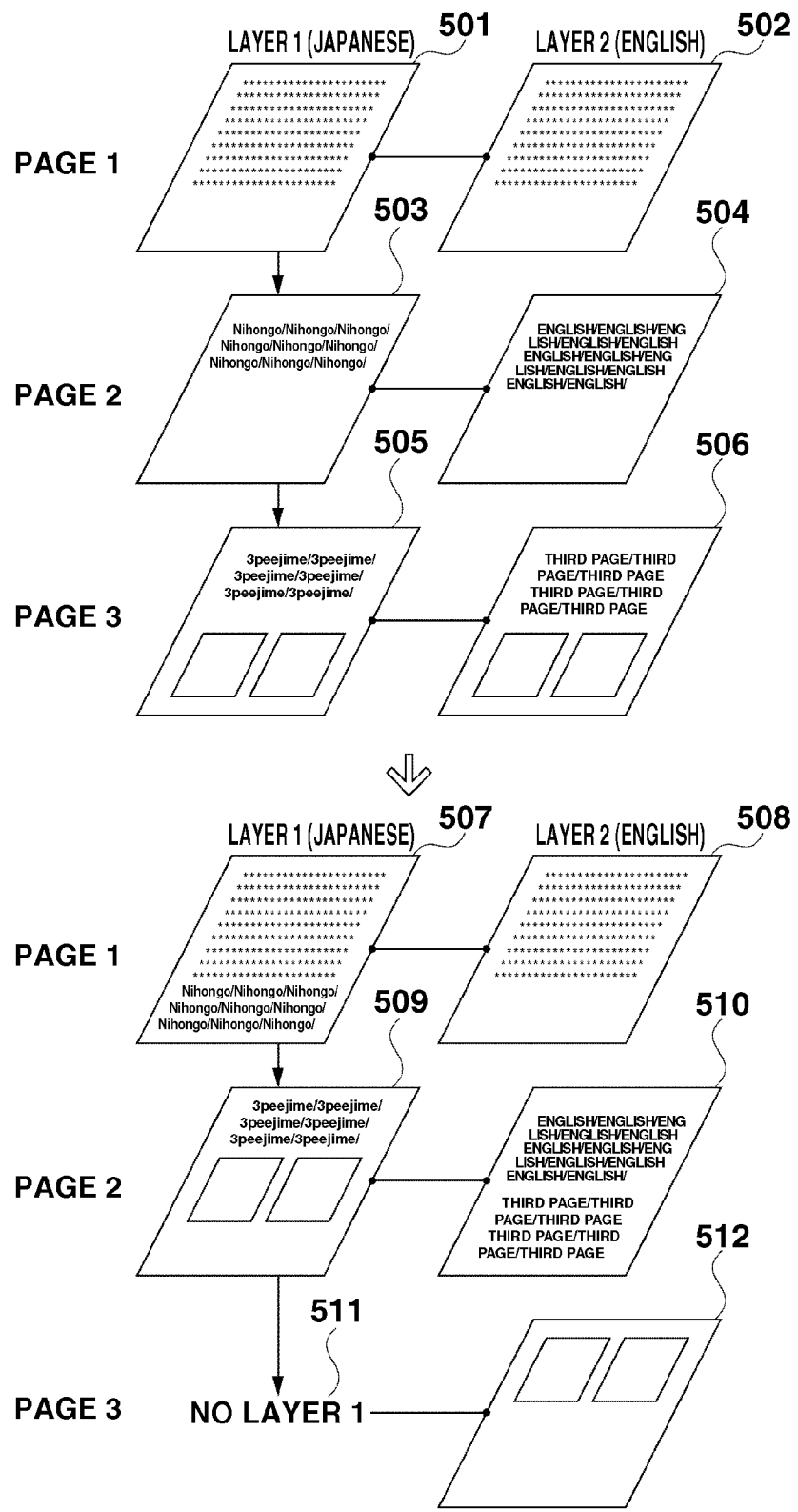
FIG. 5 illustrates a processing result of space saving processing.

In the example illustrated in FIG. 5, the space saving processing unit 9 executes the space saving processing on the objects of Japanese layer to obtain output results 507, 509, and 511.

The object in the second page 503 is moved to a blank region in the first page 501 by the space saving processing, so that the output result 507 is acquired.

Further, the objects in the third page 505 are moved to a blank region in the second page 503 by the space saving processing, so that the output result 509 is acquired. As a result of this, the objects in the third page 505 disappear, so that the third page 511 is deleted.

Subsequently, the space saving processing unit 9 executes the space saving processing on objects of English layer to obtain output results 508, 510, and 512.

Since the object located in the second page 504 does not fit in a blank region in the first page 502 of English layer, the object in the second page 504 is not moved even when the space saving processing is executed. As a result of this, the first page 502 becomes the same output result 508 as the first page 502 even when the space saving processing is executed.

Further, a text object on the upper side in third page 506 is moved to the second page 504 by the space saving processing, so that the output result 510 is acquired. As the result of this, only graphic objects on the lower side in the third page 506 remain in the third page, so that the output result 512 is acquired.

Finally, as illustrated in pages 507 to 512, the information processing apparatus can perform space saving processing to each displayed/non-displayed layer, treat a document like formers by switching the display/non-display state, and execute layout processing without mixing objects of a plurality of layers like an example illustrated in FIG. 3.

In addition, in step S404 in FIG. 4, objects of non-displayed layer are also selected as a target object according to display attributes of layers. However, only an object of displayed layer can be selected as a target layout for the space saving processing. In such a case, the non-displayed layer remains in the original pages as it is since the non-displayed layer is not subjected to the space saving processing.

Further, in the example illustrated in FIG. 5, both the displayed and non-displayed layers exist in each page. However, the space saving processing according to the present exemplary embodiment can be applied to a document in which a page containing both the displayed and non-displayed layers and a page not containing only one of the displayed and non-displayed layers are mixed.

For example, a document in which the first page contains two layers (pages 501 and 502), the second page does not contain a plurality of layers, and the third page contains two layers (pages 505 and 506) can be used as the target document.

In this case, the space saving processing unit 9 selects each object of pages 501, 503, and 505 as the displayed layer and each object of pages 502, 503, and 506 as the non-displayed layer. In other words, the second page not containing a plurality of layers is contained in both layers.

When movement of objects takes place ranging over a page by performing the space saving processing for every layer in step S405, the second page not containing a layer now has two layers, displayed layer and non-displayed layer.

In step S406, the space saving processing unit 9 stores the document, in which the space saving processing is executed in step S405 or step S407, in a hard disk 4, or performs print processing by transmitting print data to the printing apparatus 11. In addition, the result in step S405 can be displayed in addition to printing. In other words, in step S406, a display processing operation for outputting a result of processing in step S405 can be executed.

According to the first exemplary embodiment, the information processing apparatus can execute suitable space saving processing on a document containing a plurality of layers.

In the first exemplary embodiment, as illustrated in the displayed layer 511 and the non-displayed layer 512 in the third page illustrated in FIG. 5, there is a case that the number of all output pages of each layer becomes different by performing space saving processing for every layer. In the example illustrated in FIG. 5, the displayed layer has two pages and the non-displayed layer has three pages.

In such a case that the number of all output pages differs with each layer, it may be difficult to confirm a document content and a layout. For example, in a case where the number of pages differs with each layer, when an English text is confirmed while matching both of a Japanese print product and an English print product, it may become difficult to match both print products.

A second exemplary embodiment of the present invention is directed to solving an issue arising in such a case where the number of all output pages differs with each layer.

Figure 6:
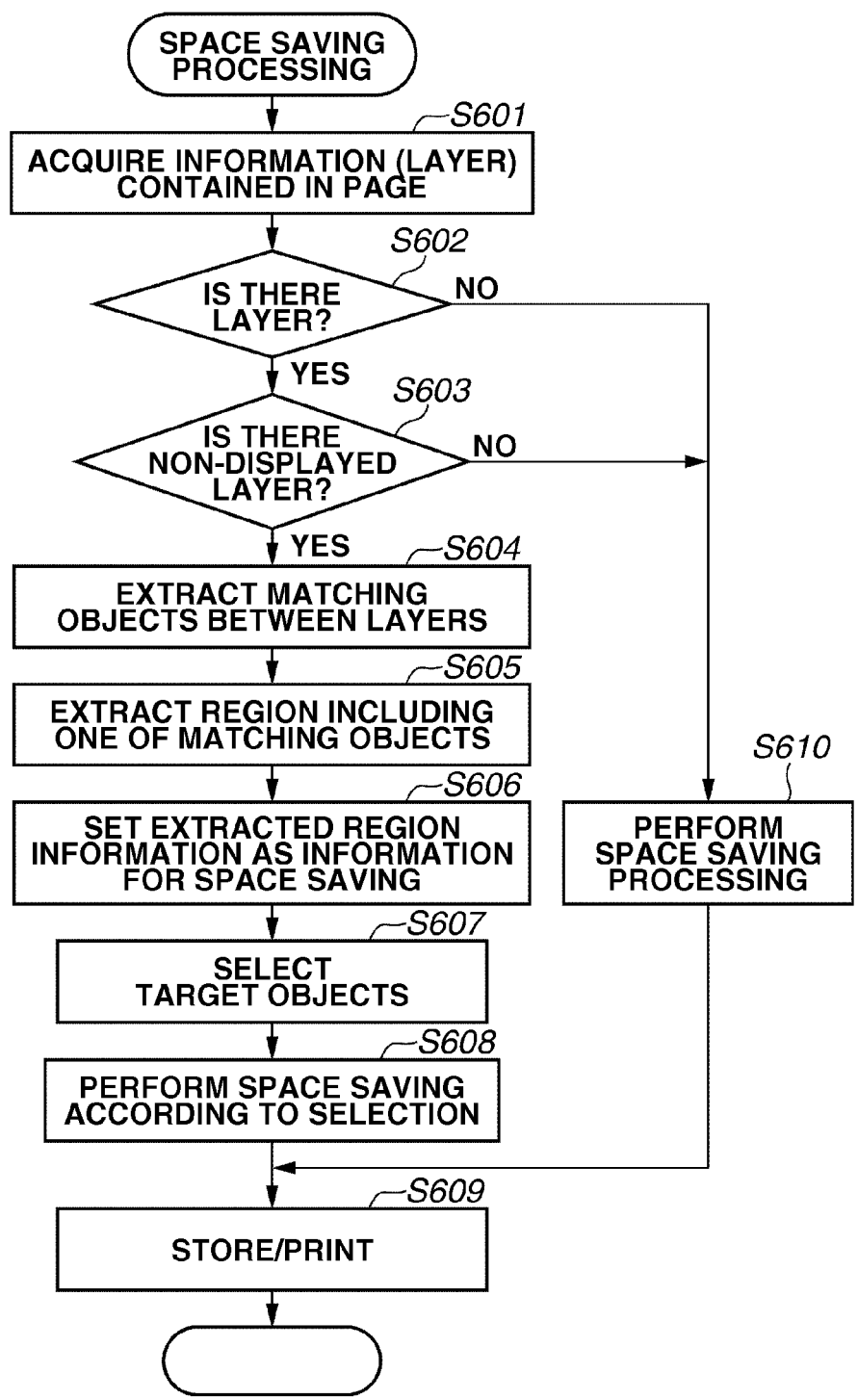
FIG. 6 is a flowchart illustrating space saving processing according to a second exemplary embodiment of the present invention.

FIG. 6 is a flowchart illustrating space saving processing according to the second exemplary embodiment. In addition, the processing illustrated in FIG. 6 is executed, for example, when a synchronization mode for synchronizing an output sheet number of a plurality of layers is set.

In addition, the processing in steps S601 to 603 is similar to the processing in steps S401 to 403, so that a detailed description thereof will not be repeated.

Figure 7:
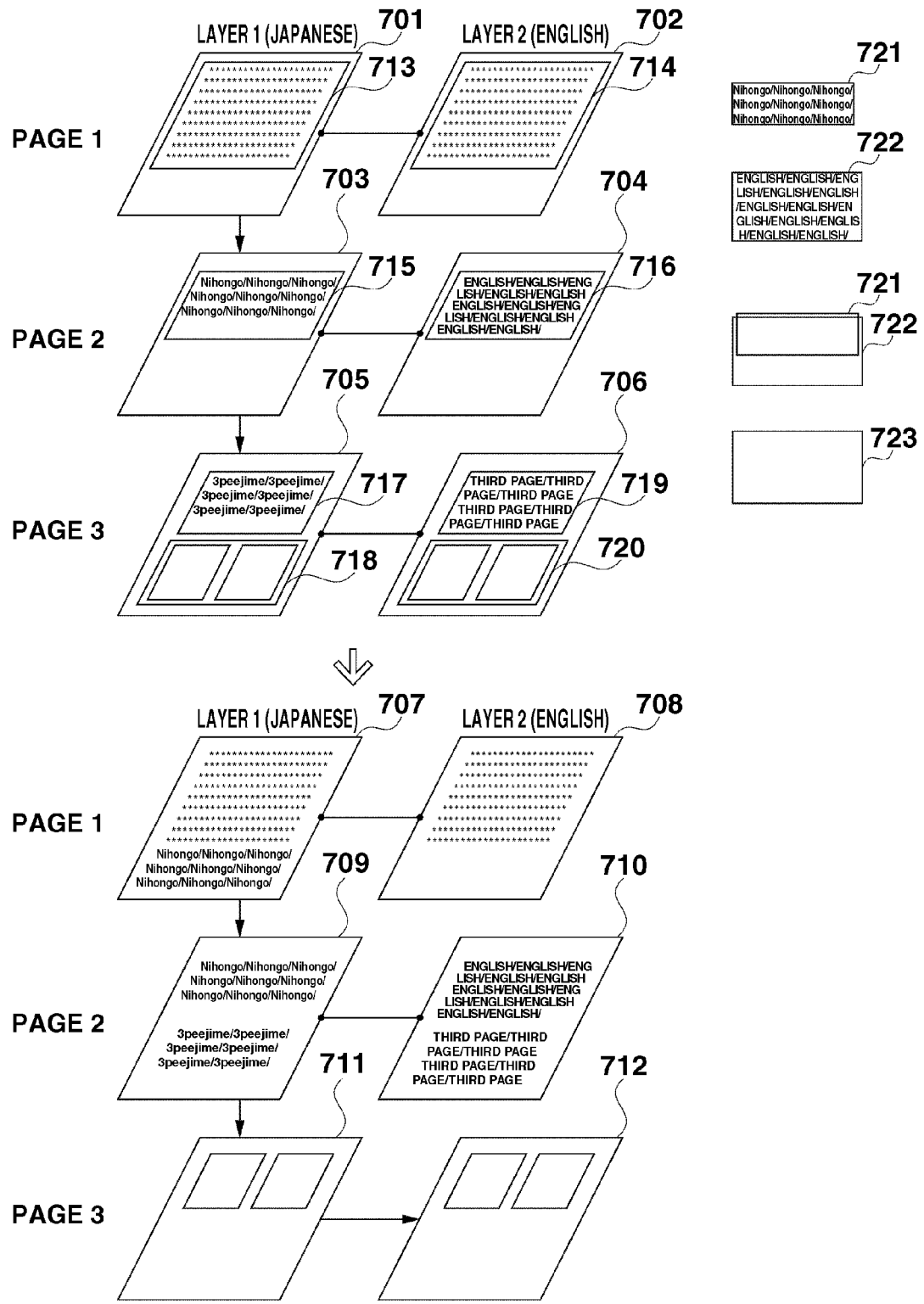
FIG. 7 illustrates a processing result of space saving processing.

In step S604, the object processing unit 8 extracts objects matching between layers. More specifically, the object processing unit 8 piles the layers up for every page, and extracts the piled objects as the matching objects. In an example illustrated in FIG. 7, since a Japanese text 713 and an English text 714 match each other in the first page, the object processing unit 8 extracts the object 713 and the object 714 as first matching objects.

In the second page, since a Japanese text 715 and an English text 716 match each other, the object processing unit 8 extracts the object 715 and the object 716 as second matching objects.

In the third page, since a Japanese text 717 and an English text 719 match each other, the object processing unit 8 extracts the object 717 and the object 719 as third matching objects. Further, since a graphic 718 and a graphic 720 match each other, the object processing unit 8 extracts the object 718 and the object 720 as fourth matching objects.

In step S605, the object processing unit 8 extracts a region containing one of the matching objects about each matching object and, in step S606, stores the extracted information as region information for space saving, in association with each object. In the example illustrated in FIG. 7, the object processing unit 8 extracts a Japanese text 715 and an English text 716 in the second page as second matching objects. The object processing unit 8 piles up circumscribed rectangles 712 and 722 of the texts 715 and 716 and further specifies a circumscribed rectangle 723 containing one of both rectangles, so that the extraction processing in step S605 is realized.

An example of information stored in step S606 is described as follows.

| Page No. | Layer No. | OBJ ID | Matching OBJ ID | Rectangle Information | Rectangle Information for Space Saving |
|---|---|---|---|---|---|
| 2 | 1 | 2101 | 2201 | (100, 100)-(1500, 800) | (90, 100)-(1510, 1200) |
| 2 | 2 | 2201 | 2101 | (90, 110)-(1510, 1200) | (90, 100)-(1510, 1200) |
| ... | ... | ... | ... | ... | ... |

The Japanese text 715 becomes OBJ ID 2101 region, the English text 716 becomes OBJ ID 2201 region, and the region information containing one of both objects becomes (90, 100)-(1510,1200).

In step S607, the object processing unit 8 selects target objects for space saving. This processing is similar to the processing in step S404, so that a detail description thereof is not repeated.

In step S608, the space saving processing unit 9 performs the space saving processing on the objects selected in step S607. The space saving processing is similar to the example of the first exemplary embodiment, but the rectangle information to be used is the region information for space saving that is extracted in step S605.

By performing these processing, the information processing apparatus can perform the space saving processing with a similar page configuration and a similar layout even when the layers are different, and the number of all pages becomes the same in each layer.

In addition, the processing in step S610 executed when the layer processing unit 7 determines NO in steps S602 and S603, is similar to the processing in step S407, and the processing in step S609 is similar to the processing in step S406, so that the detailed description thereof is not repeated.

As described above, according to the second exemplary embodiment, the information processing apparatus can correctly perform space saving even when the space saving processing is performed on a document having layers. Further, since the number of all pages is the same for each layer, a user operation for confirming an output product can be simplified.

Figure 8:
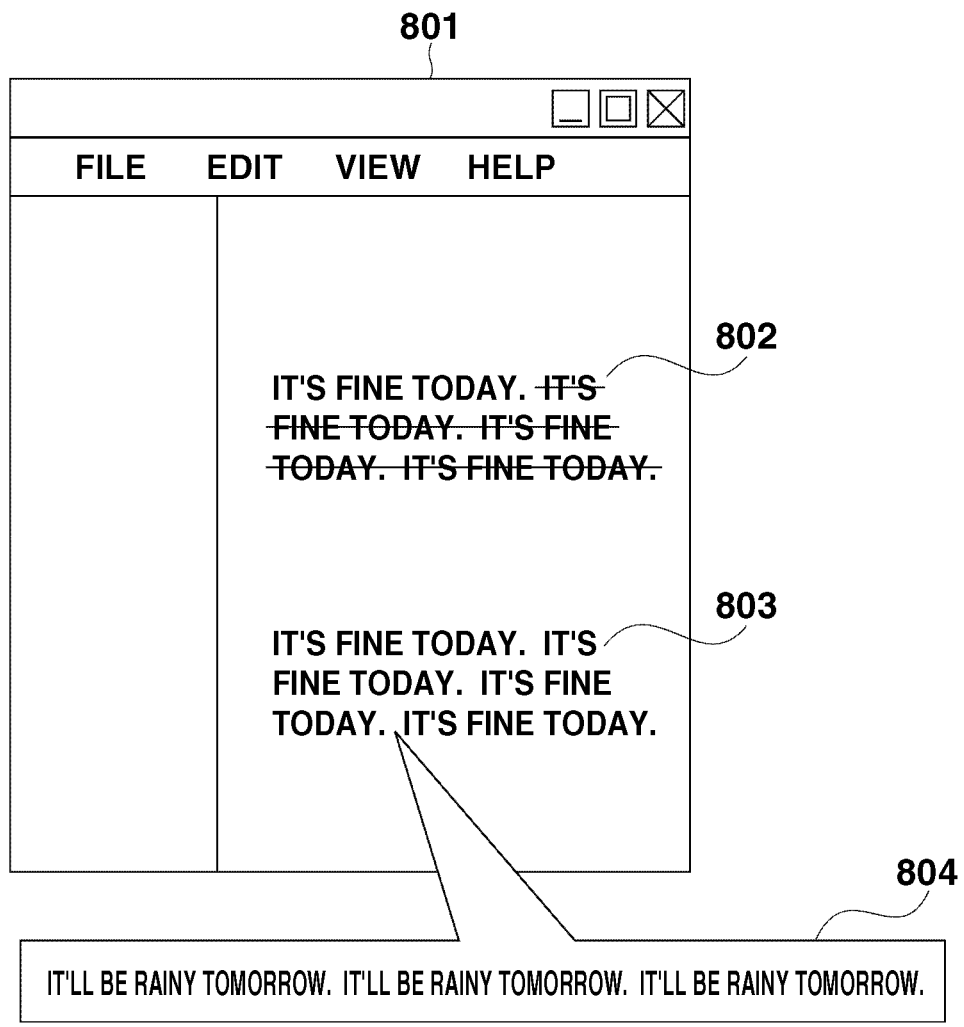
FIG. 8 illustrates an example of a document.

For example, when a plurality of persons performs proofreading processing, correction information is added to a document as illustrated in FIG. 8. The correction information cannot be reflected beforehand since a proofreading result is not finally confirmed. When the correction information is reflected in the document information, an output result may be greatly affected. In such a case, an output result acquired by executing space saving processing on a document in which the correction information is not yet reflected is greatly different from an output result acquired by executing space saving processing on a document in which the correction information is reflected. Further, a user may receive an increased load of operability if the user gives an instruction for reflecting text correction information on a case-by-case basis.

FIG. 8 illustrates a display UI 801 in which correction information is not yet finally confirmed.

In the display UI 801 illustrated in FIG. 8, strike-through indicating correction information for deleting text is illustrated, thus indicating that a text region 802 is to be finally reduced.

On the other hand, in the display UI 801 illustrated in FIG. 8, correction information for inserting a text 804 into a text region 803 is illustrated, thus indicating that the text region 803 is to be enlarged.

Figure 9:
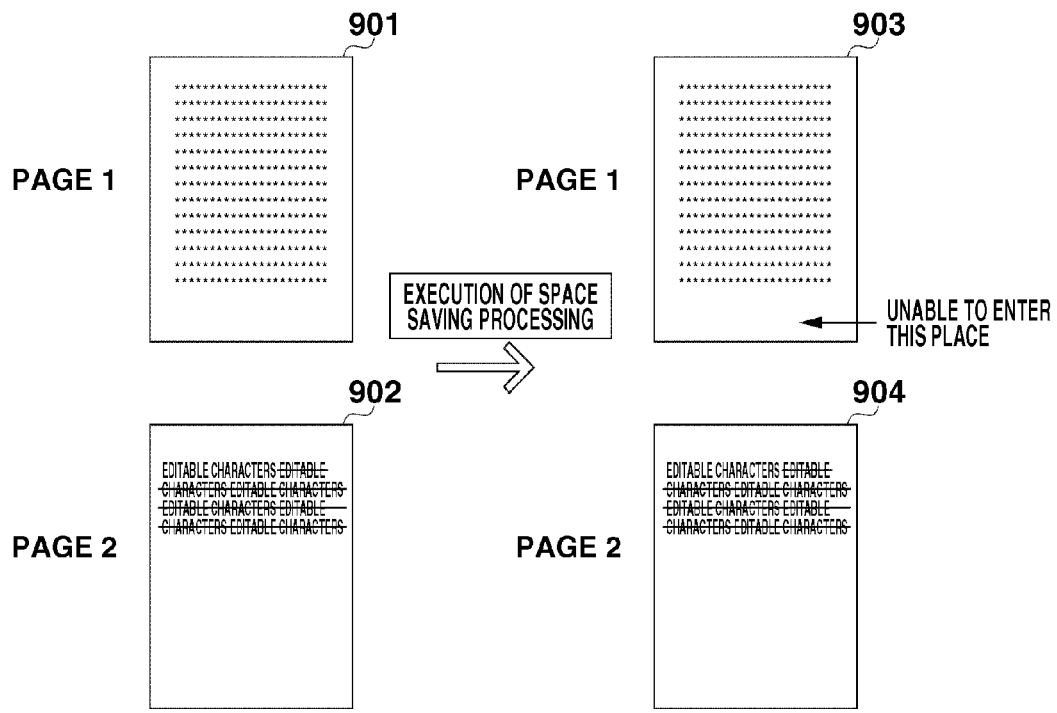
FIG. 9 illustrates an example of a document.

In an example illustrated in FIG. 9, there is a document including a first page 901 and a second page 902, and strike-through is added to a text in the second page 902. Results of performing space saving in this state are illustrated in a page 903 and a page 904. Finally, since the text in the second page 904 has only 19 editable characters, it is possible to move it to the first page 903. However, the space saving processing unit 9 determines that the text in the second page 904 cannot be fit in a blank region in the first page 901 because the rectangle information indicates a large rectangle containing strike-through, and thus does not move the text in the second page 902.

In a third exemplary embodiment of the present invention, space saving processing on a document containing correction information will be described.

Figure 10:
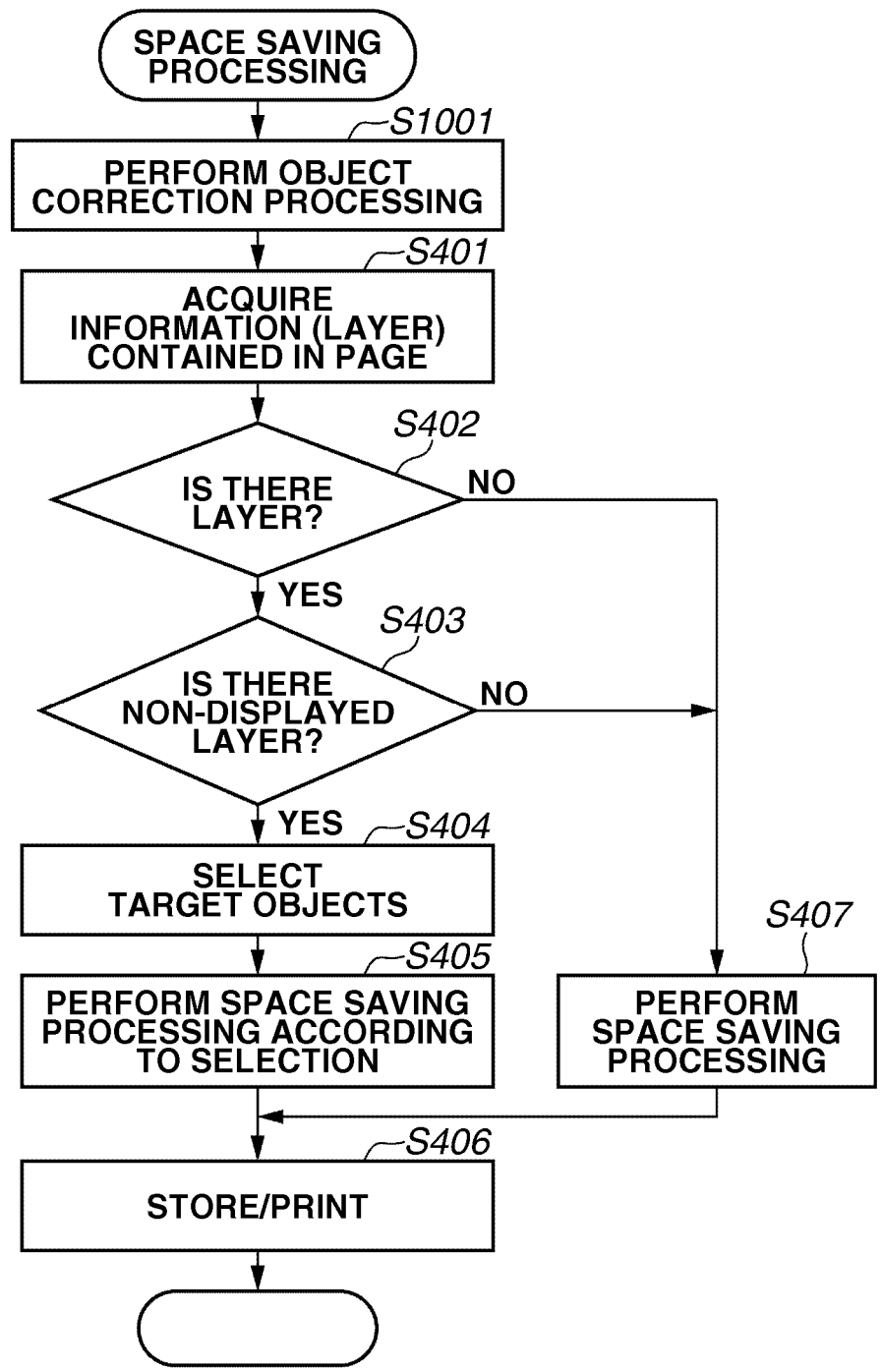
FIG. 10 is a flowchart illustrating space saving processing according to a third exemplary embodiment of the present invention.

FIG. 10 is a flowchart illustrating space saving processing according to the third exemplary embodiment. Step S1001 is a feature of the third exemplary embodiment, and processing thereafter is similar to that in the first exemplary embodiment.

Figure 11:
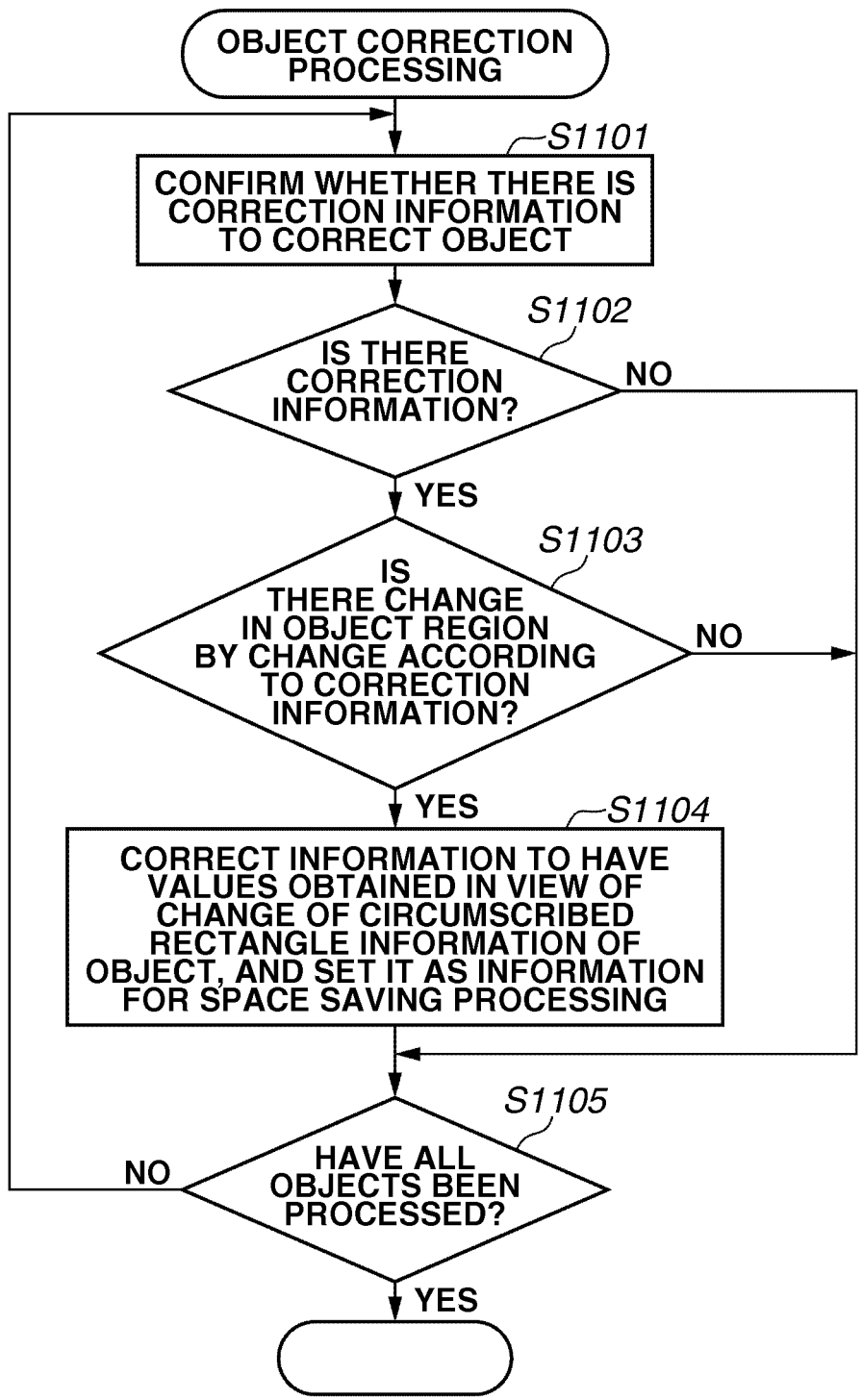
FIG. 11 is a flowchart illustrating object correction processing.

FIG. 11 is a flowchart illustrating object correction processing in step S1001.

In step S1001, the object processing unit 8 confirm whether there is correction information to correct an object. The object processing unit 8 can confirm whether the correction information is added, by analyzing a description command configuring a processing target page, to execute the processing in step S1101.

As a result of confirmation processing in step S1101, then in step S1102, when the object processing unit 8 confirms that there is correction information, the processing proceeds to step S1103. When, in step S1102, the object processing unit 8 confirms that there is no correction information, the processing proceeds to step S1105.

In step S1103, the object processing unit 8 determines whether the size of an object region of a document changes by reflecting the correction information. In the example illustrated in FIG. 8, since there are the correction information indicating deletion and the correction information indicating insertion of characters, the object processing unit 8 determines that the size of the object region changes. On the other hand, when there is not a change in the size of the object region in step S1103, the processing proceeds to step S1105.

In step S1104, the object processing unit 8 stores the region size of the object in which the correction information is reflected, as rectangle information for space saving. The following data is an example of the rectangle information.

| Page No. | Layer No. | OBJ ID | Matching OBJ ID | Rectangle Information | Rectangle Information for Space Saving |
|---|---|---|---|---|---|
| 2 | 1 | 2101 | — | (100, 400)-(1500, 800) | (100, 400)-(1000, 500) |
| 2 | 1 | 2102 | — | (100, 1200)-(1500, 1600) | (100, 1200)-(1500, 1800) |
| ... | ... | ... | ... | ... | ... |

In step S1105, the object processing unit 8 confirms whether the processing from step S1101 to step S1104 has been executed on all objects. When the all objects have been processed, the processing proceeds to step S401 illustrated in FIG. 10.

According to the above processing, even when a user executes space saving processing on a document containing correction information, the information processing apparatus can realize suitable space saving processing without increasing an operation load on a user.

The information processing apparatus according to an exemplary embodiment of the present invention can perform suitable space saving processing even on a document in which a design or a text is changed in each layer.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-246670 filed Oct. 27, 2009, which is hereby incorporated by reference herein in its entirety.

What is claimed is:

1. A method for controlling an information processing apparatus configured to alternately display a first layer and a second layer in a document, the method comprising:
   selecting a target layer to be output, from the first layer and the second layer;
   determining, when the first layer is selected as the target layer, whether an object in a second page of the first layer can be relocated in a blank region in a first page of the first layer, the second page following the first page;
   determining, when the first layer is selected as the target layer, whether an object in a second page of the second layer can be relocated to a blank region in a first page of the second layer, the second page of the second layer following the first page of the second layer;
   relocating the object in the second page of the first layer to the first page of the first layer when it is determined that the object of the second page of the first layer can be relocated in the first page of the first layer;
   relocating the object in the second page of the second layer to the first page of the second layer when it is determined that the object of the second page of the second layer can be relocated in the first page of the second layer; and
   deleting a page in which an object disappeared after relocating the object,
   wherein an output result of the first layer is different from an output result of the second layer, and
   wherein a number of pages to be deleted from the first layer is different from a number of pages to be deleted from the second layer.

2. An information processing apparatus configured to alternately display a first layer and a second layer in a document, the information processing apparatus comprising:
   a processor; and
   a memory storing instructions that, when executed by the processor, cause the information processing apparatus to:
   select a target layer to be output, from the first layer and the second layer;
   determine, when the first layer is selected as the target layer, whether an object in a second page of the first layer can be relocated to a blank region in a first page of the first layer, the second page following the first page;
   determine, when the first layer is selected as the target layer, whether an object in a second page of the second layer can be relocated to a blank region in a first page of the second layer, the second page of the second layer following the first page of the second layer;
   relocate the object in the second page of the first layer to the first page of the first layer when it is determined that the object of the second page of the first layer can be relocated in the first page of the first layer;
   relocate the object in the second page of the second layer to the first page of the second layer when it is determined that the object of the second page of the second layer can be relocated in the first page of the second layer; and
   delete a page in which an object disappeared after the object has been relocated,
   wherein an output result of the first layer is different from an output result of the second layer, and
   wherein a number of pages to be deleted from the first layer is different from a number of pages to be deleted from the second layer.

3. The information processing apparatus according to claim 1, wherein the instructions further cause the information processing apparatus to set a synchronization mode for causing a number of output sheets of the first layer and that of the second layer to be the same, and
   wherein, when the synchronization mode is set, objects of each layer are located such that the number of output sheets become the same.

4. The information processing apparatus according to claim 1, wherein the instructions further cause the information processing apparatus to:
   determine whether correction information is added to the selected target layer; and change an object in the target layer based on the correction information, when it is determined that the correction information is added to the target layer, wherein, in the target layer in which the object is changed, it is determined whether an object in the second page can be relocated in a blank region in the first page.

5. A computer readable storage medium storing a program for causing a computer to execute a method for controlling an information processing apparatus configured to alternately display a first layer and a second layer in a document, the method comprising:

selecting a target layer to be output, from the first layer and the second layer;

determining, when the first layer is selected as the target layer, whether an object in a second page of the first layer can be relocated in a blank region in a first page of the first layer, the second page following the first page;

determining, when the first layer is selected as the target layer, whether an object in a second page of the second layer can be relocated to a blank region in a first page of the second layer, the second page of the second layer following the first page of the second layer;

relocating the object in the second page of the first layer to the first page of the first layer when it is determined that the object of the second page of the first layer can be relocated in the first page of the first layer;

relocating the object in the second page of the second layer to the first page of the second layer when it is determined that the object of the second page of the second layer can be relocated in the first page of the second layer; and deleting a page in which an object disappeared after relocating the object, wherein an output result of the first layer is different from an output result of the second layer, and wherein a number of pages to be deleted from the first layer is different from a number of pages to be deleted from the second layer.

\* \* \* \* \*